US008730149B2

(12) United States Patent
Chiang et al.

(10) Patent No.: US 8,730,149 B2

(45) Date of Patent: May 20, 2014

(54) METHOD FOR BACK LIGHT CONTROL AND APPARATUS THEREOF

(75) Inventors: Wei-Shan Chiang, Tai-Chung (TW); Meng-Yong Lin, Hsinchu (TW); Wei-Yang Ou, Kao-Hsiung (TW); Chen-Hsien Han, Hsinchu (TW); Ming-Huang Liu, Taipei Hsien (TW)

(73) Assignee: ILI Technology Corp., Jhubei, Hsinchu County (TW)

( * ) Notice: Subject to any disclaimer, the term of this patent is extended or adjusted under 35 U.S.C. 154(b) by 613 days.

(21) Appl. No.: 12/538,875

(22) Filed: Aug. 11, 2009

(65) Prior Publication Data

US 2010/0321285 A1 Dec. 23, 2010

(30) Foreign Application Priority Data

Jun. 23, 2009 (TW) ............................... 98120933 A

(51) Int. Cl.

*G09G 3/36* (2006.01)
*G09G 5/00* (2006.01)
*G06F 3/038* (2013.01)

(52) U.S. Cl.

USPC ........................................... 345/102; 345/213

(58) Field of Classification Search

USPC .................................................. 345/102, 213
See application file for complete search history.

(56) References Cited

U.S. PATENT DOCUMENTS

| | | | | |
|---|---|---|---|---|
| 6,429,839 | B1 * | 8/2002 | Sakamoto | 345/102 |
| 2006/0125742 | A1 | 6/2006 | Sekiguchi | |
| 2009/0015179 | A1 * | 1/2009 | Hatano et al. | 315/307 |

FOREIGN PATENT DOCUMENTS

| | | |
|---|---|---|
| CN | 101154353 A | 4/2008 |
| CN | 101192376 A | 6/2008 |
| TW | 478295 | 3/2002 |
| TW | 1308313 | 4/2009 |

* cited by examiner

*Primary Examiner* — Kevin M Nguyen

(74) *Attorney, Agent, or Firm* — Winston Hsu; Scott Margo

(57) ABSTRACT

A method for backlight control includes: receiving a display synchronization signal; generating a backlight control signal according to the display synchronization signal; and driving a backlight source according to the backlight control signal. An apparatus for backlight control includes: a signal receiving circuit, for receiving a display synchronization signal; a control circuit, coupled to the signal receiving circuit, for generating a backlight control signal according to the display synchronization signal; and a driving circuit, coupled to the control circuit, for driving a backlight source according to the backlight control signal.

4 Claims, 4 Drawing Sheets

METHOD FOR BACK LIGHT CONTROL AND APPARATUS THEREOF

BACKGROUND OF THE INVENTION

1. Field of the Invention

The present invention relates to illuminant controls, and more particularly, to a method for backlight control and an apparatus thereof.

2. Description of the Prior Art

Traditional display methods of liquid crystal display (LCD) devices need to determine if a received frame signal corresponds to a dynamic/motion frame or a still/static frame; therefore, additional detecting circuits, memories and/or temporary storage devices are required for determining the corresponding type (i.e., dynamic frame or still frame) of the received frame signal by comparing the received frame signal with a frame signal that precedes the received frame signal. Once the received frame signal is judged to correspond to a dynamic frame, a flashing backlight source will be enabled to display the frame signal(s). This flashing backlight control leads to extra loading of the central processing unit (CPU), the timing controller, and the data bus of the LCD device. Moreover, the conventional backlight control also consumes huge power due to the necessity of an additional detecting circuit and data buses.

SUMMARY OF THE INVENTION

It is therefore one of the objectives in the present invention to provide a method for backlight control and an apparatus thereof, to solve the problems of the conventional backlight control scheme and to promote display quality of high dynamic range images, thereby avoiding unpleasant image residue and blur.

According to an exemplary embodiment of the present invention, a method for backlight control is provided. The method for backlight control includes: receiving a display synchronization signal; generating a backlight control signal according to the display synchronization signal; and driving a backlight source according to the backlight control signal.

According to another exemplary embodiment of the present invention, an apparatus for backlight control is provided. The apparatus for backlight control includes: a signal receiving circuit, for receiving a display synchronization signal; a control circuit, coupled to the signal receiving circuit, for generating a backlight control signal according to the display synchronization signal; and a driving circuit, coupled to the control circuit, for driving a backlight source according to the backlight control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
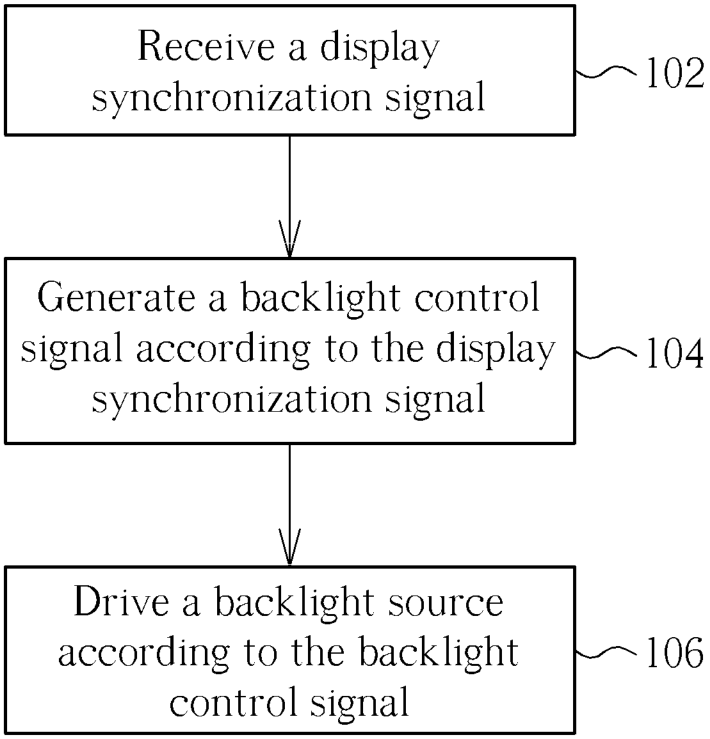
FIG. 1 PRIOR ART
FIG. 1 is a flowchart illustrating an exemplary embodiment of the method for backlight control disclosed in the present invention.

Please refer to FIG. 1. FIG. 1 is a flowchart illustrating an exemplary embodiment of the method for backlight control disclosed in the present invention. The exemplary operational details of the method for backlight control are disclosed as follows. As shown in FIG. 1, in step 102, a display synchronization signal is received, such as a horizontal synchronization signal and/or a vertical synchronization signal. In step 104, a backlight control signal is derived according to the display synchronization signal; please note that, in a preferred embodiment of the present invention, the backlight control signal can be derived via executing a frequency-dividing operation upon the display synchronization signal. Furthermore, a frequency applied in the aforementioned frequency-dividing operation for frequency-dividing the display synchronization signal to thereby derive the backlight control signal can be a switching frequency, wherein the switching frequency drives a backlight source to continuously switch between a plurality of luminous output states, where each luminance of the luminous output states differs. Moreover, the aforementioned luminous output states includes a full-light backlight state and a full-dark backlight state; however, the aforementioned descriptions are for illustrative purposes only and are not meant to be a limitation of the present invention. In step 106, the backlight sources are driven to the aforementioned plurality of different luminous output states according to the backlight control signal to achieve the backlight control of the present invention. Please note that, by applying the provided method for backlight control herein, the display quality of high dynamic range (HDR) images/frames is efficiently promoted and annoying blur is avoided by executing a frequency-dividing operation to generate a driving signal from a frequency-dividing period signal (e.g., the display synchronization signal) which has a frequency higher than the driving signal. For example, a bad vision reaction of human eyes when viewing the dynamic frames is effectively solved by selectively driving the backlight source into the full-light/full-dark luminous output states.

Please note that the operative way of the above-mentioned frequency-dividing operation are for illustrative purposes only, and can be execute in any alternative workable manner. For instance, in an exemplary embodiment, for executing the frequency-dividing operation in step 104, a counter is used for calculating each period of the display synchronization signal, and executes a level toggle when a counter value of the counter exceeds a threshold value; in this way, with a properly selected threshold value, the required backlight control signal is generated by frequency-dividing the display synchronization signal to thereby control the driving operation of the backlight source. For example, the threshold value corresponding to the counter value can be properly selected according to a switching frequency of the plurality of distinct luminous output states, to thereby control the backlight source to switch among the aforementioned plurality of distinct luminous output states continuously. However, the aforementioned description of applying the counter to execute the frequency-dividing operation is for illustrative purposes only and is also not meant to be a limitation of the present invention.

Figure 2:
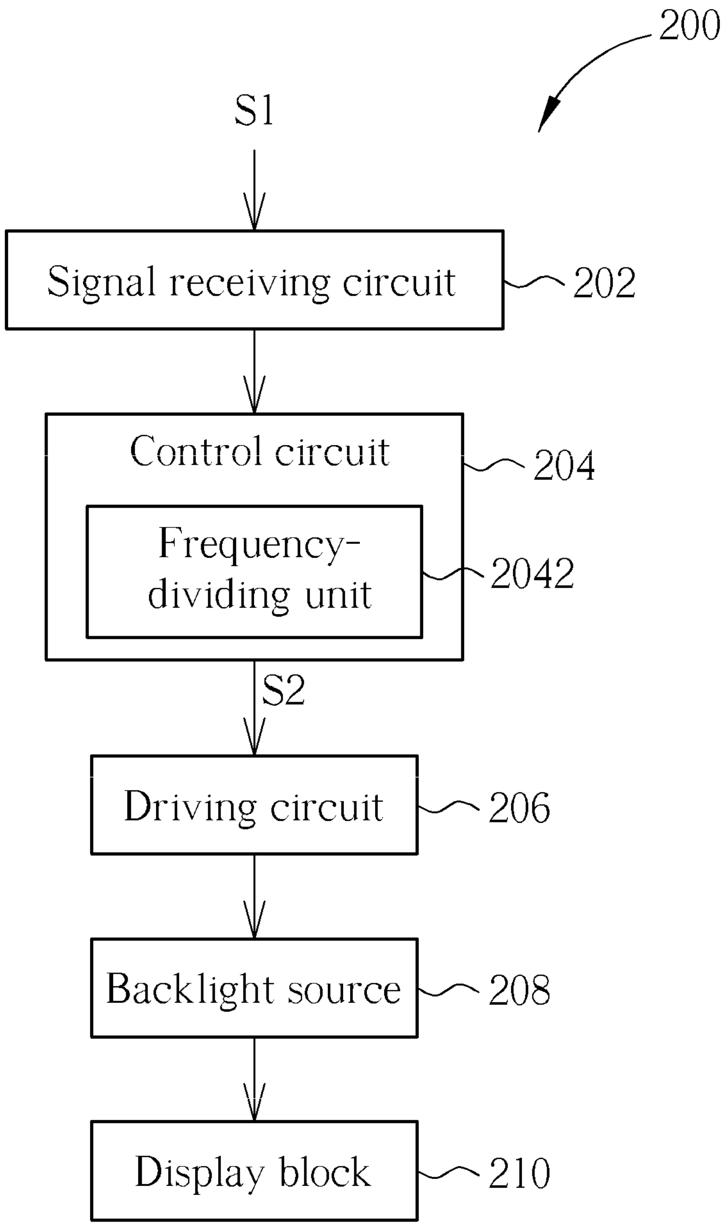
FIG. 2 is a block diagram illustrating an exemplary embodiment of an apparatus for backlight control according to the present invention.

Please refer to FIG. 2. FIG. 2 is a block diagram illustrating an exemplary embodiment of an apparatus 200 for backlight control of the present invention. As shown in FIG. 2, the apparatus 200 includes: a signal receiving circuit 202 for receiving a display synchronization signal S1; a control circuit 204, which couples to the signal receiving circuit 202, for generating a backlight control signal S2 according to the display synchronization signal S1; a display block 210, used for displaying a corresponding frame according to the display synchronization signal S1 wherein the frame may be a motion/dynamic frame or a static/still frame; a backlight source (e.g., a backlight block) 208 is used as a light source required by a display block (e.g., a LCD) 210; and a driving circuit 206, coupled to the control circuit 204, wherein the driving circuit 206 drives the backlight source 208 according to the backlight control signal S2. In a preferred exemplary embodiment of the present invention, the display block 210 can be a small-size LCD panel and the driving circuit 206 controls the backlight source 208 to switch between a full-light backlight state and a full-dark backlight state selectively. Furthermore, a frequency-dividing unit 2042 executes the frequency-dividing operation upon the display synchronization signal S1 according to a switching frequency to thereby generate the required backlight control signal S2, wherein the switching frequency is used for driving the backlight source 208 to switch between a plurality of distinct luminous output states, and the above-mentioned plurality of luminous output states includes the full-light backlight state and the full-dark backlight state.

Figure 3:
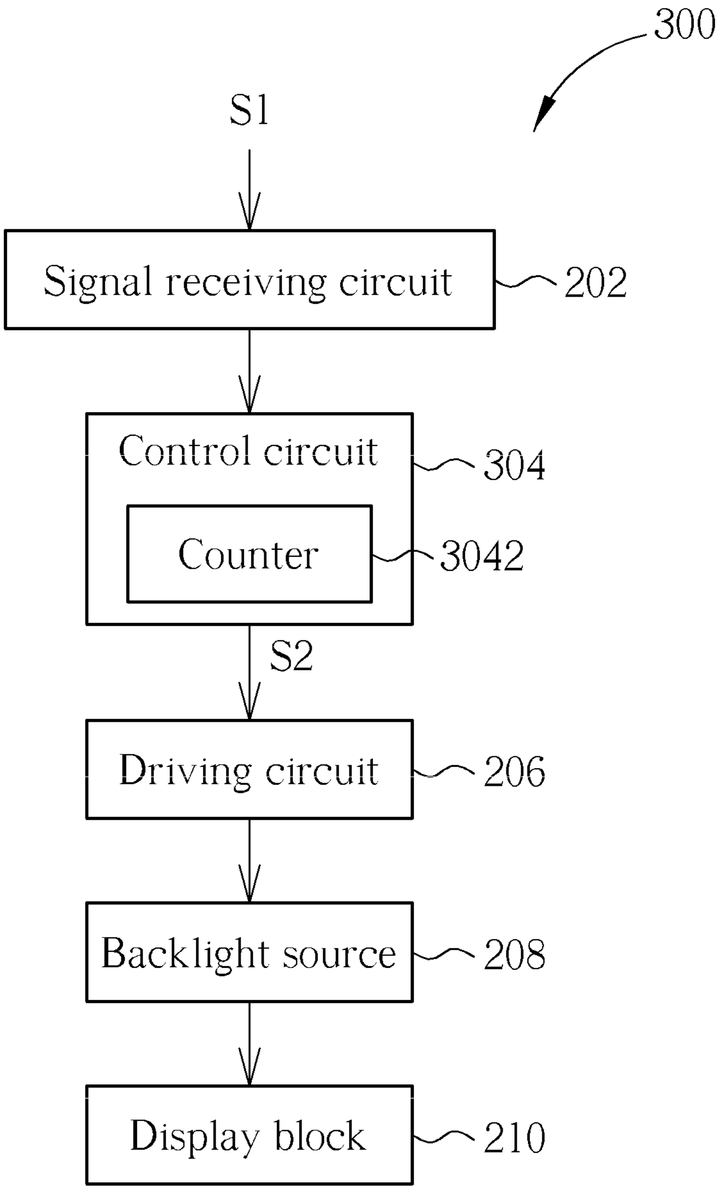
FIG. 3 is a block diagram illustrating another exemplary embodiment of the apparatus for backlight control according to the disclosure of the present invention.

Please note that any electric units with a frequency-dividing functionality can be adopted as the aforementioned frequency-dividing unit 2042. Please refer to FIG. 3. FIG. 3 is a block diagram illustrating another exemplary embodiment of the apparatus 300 for backlight control according to the disclosure of the present invention. As shown in FIG. 3, the apparatus 300 includes a signal receiving circuit 202; a control circuit 304; a driving circuit 206; a backlight source 208; and a display block 210. Herein the difference between the apparatus 200 and the apparatus 300 is that the apparatus 200 uses a counter 3042 to implement the frequency-dividing unit 2042. Since the operations and functionalities of other circuit elements in the apparatus 300 have been disclosed above, further descriptions are omitted here for the sake of brevity.

Figure 4:
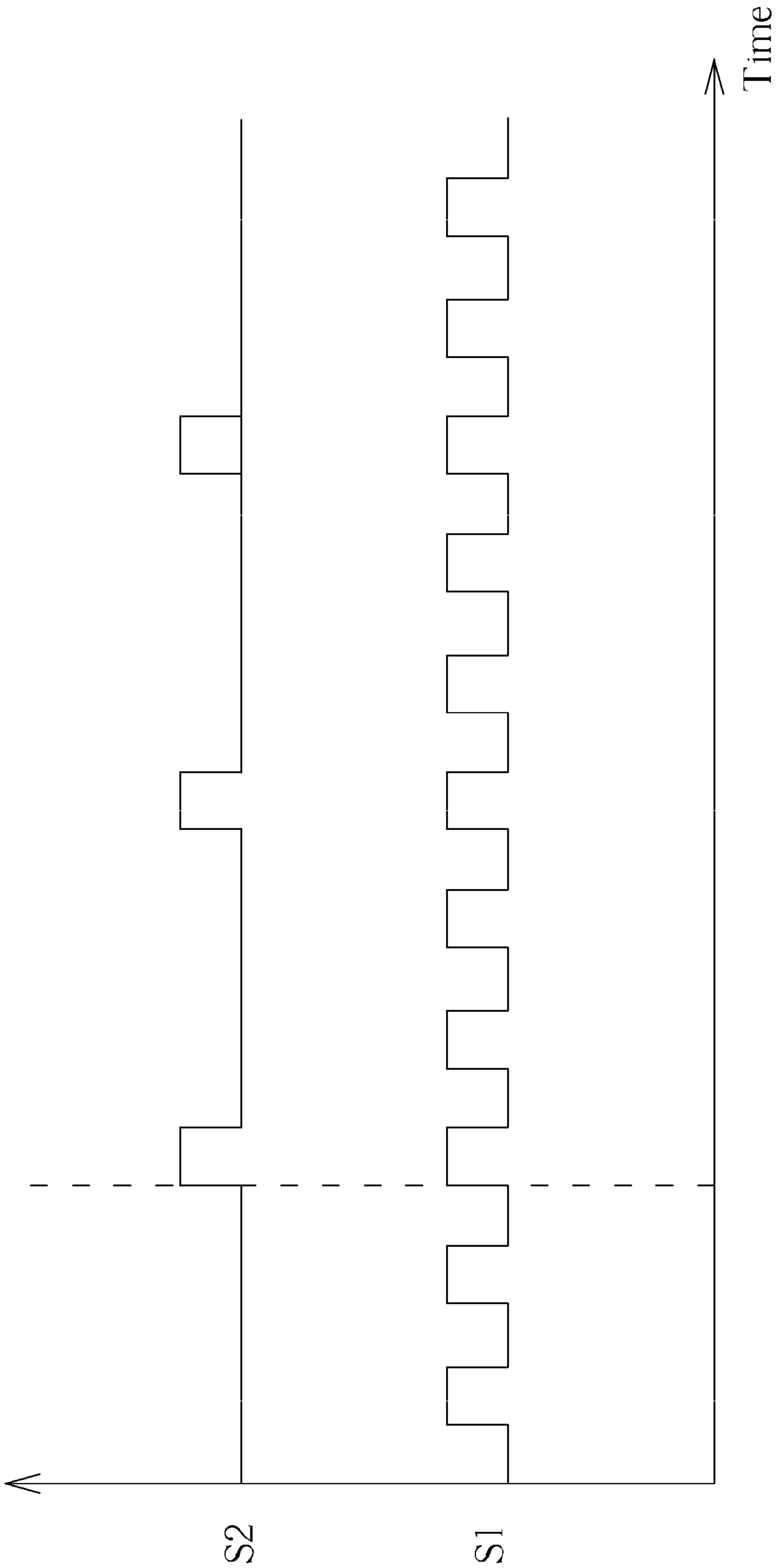
FIG. 4 is a timing diagram of the display synchronization signal S1 and the backlight control signal S2.

Please refer to FIG. 4. FIG. 4 is a timing diagram of the display synchronization signal S1 and the backlight control signal S2. As shown in FIG. 4, the display synchronization signal S1 is a periodic signal received by the signal receiving circuit 20; that is, a frequency of the display synchronization signal S1 is higher than a frequency of the backlight control signal S2 since the backlight control signal S2 is derived by executing the aforementioned frequency-dividing operation upon the display synchronization signal S1. For instance, in this embodiment, supposing a frequency-dividing factor applied in the frequency-dividing operation is "3", in this way the frequency F1 corresponding to the backlight control signal S2 is lower than the frequency F2 of the display synchronization signal S1 wherein F2=3×F1. That is, a period of the backlight control signal S2 is longer than a period of the display synchronization signal S2. The driving circuit 206 can therefore control the driving operation of the backlight source 208 according to the backlight control signal S2.

The method and the apparatus for backlight control in the present invention can avoid conventional adverse effects by applying the full-light backlight state and the full-dark backlight state of the backlight source. Please note that, since further details can be easily understood by people with ordinary skills in this art, further descriptions are omitted here for the sake of brevity.

In conclusion, the apparatus and method for the backlight control of the present invention promote the display quality of HDR images/frames to cancel annoying image residue and blur. The present invention promotes display quality by preventing adverse naked eye responses when viewing motion/dynamic images/frames, to thereby upgrade the resolution of the display image and improve the display of motion/dynamic images/frames Those skilled in the art will readily observe that numerous modifications and alterations of the device and method may be made while retaining the teachings of the invention.

What is claimed is:

1. A method for backlight control, comprising:

receiving a display synchronization signal;

generating a backlight control signal according to the display synchronization signal, wherein the step of generating the backlight control signal according to the display synchronization signal comprises:

frequency-dividing the display synchronization signal to generate the backlight control signal, wherein the frequency-dividing is controlled by the switching frequency, and the switching frequency drives a backlight source continuously to switch between a plurality of distinct luminous output states; and driving the backlight source according to the backlight control signal for displaying a corresponding frame;

wherein the backlight source is switched to one of the distinct luminous output states for displaying the corresponding frame.

2. The method of claim 1, wherein the plurality of distinct luminous output states comprises a full-light backlight state and a full-dark backlight state.

3. An apparatus for backlight control, comprising:

a signal receiving circuit, for receiving a display synchronization signal;

a control circuit, coupled to the signal receiving circuit, for generating a backlight control signal according to the display synchronization signal, wherein the control circuit comprises:

a frequency-dividing unit, for frequency-dividing the display synchronization signal to generate the backlight control signal, wherein the frequency-dividing is controlled by the switching frequency, and the switching frequency drives a backlight source continuously to switch between a plurality of distinct luminous output states; and a driving circuit, coupled to the control circuit, for driving the backlight source according to the backlight control signal for displaying a corresponding frame;

wherein the backlight source is switched to one of the distinct luminous output states for displaying the corresponding frame.

4. The apparatus of claim 3, wherein the plurality of distinct luminous output states comprises a full-light backlight state and a full-dark backlight state.

* * * * *